UNITED STATES PATENT OFFICE.

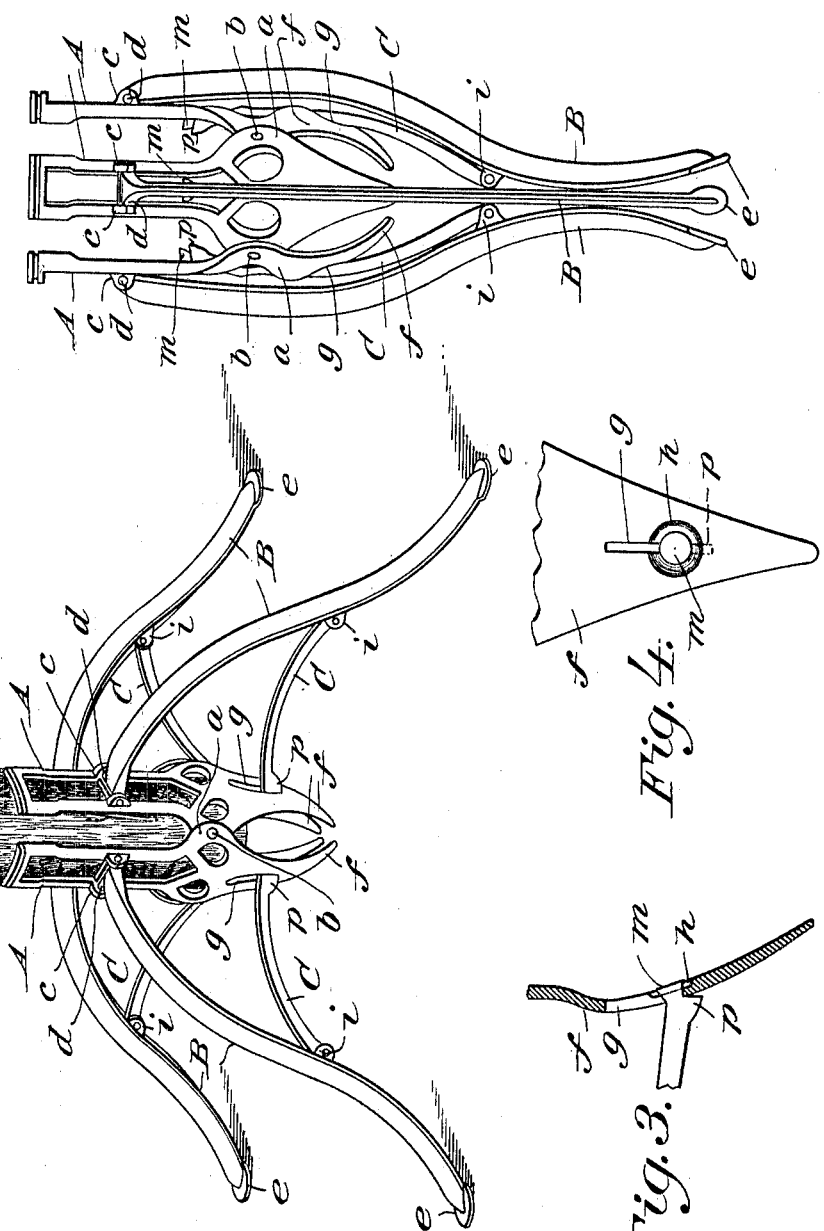

PATRICK H. KELLEHER, OF AUBURN, MAINE, ASSIGNOR OF ONE-HALF TO JOHN P. SUTTON, OF LEWISTON, MAINE.

STAND.

1,105,910. Specification of Letters Patent. Patented Aug. 4, 1914.

Application filed September 4, 1913. Serial No. 788,110.

*To all whom it may concern:*

Be it known that I, PATRICK H. KELLEHER, citizen of the United States, residing at Auburn, in the county of Androscoggin and State of Maine, have invented new and useful Improvements in Stands, of which the following is a specification.

My invention pertains to stands for holding Christmas trees and other articles in an upright or substantially upright position; and it has for its object to provide a simple and strong stand constructed with a view of being compactly folded when not in use and of being spread and set up with facility on a floor or other surface in such manner as to receive and securely hold tree trunks, staffs and other articles of various diameters, in an upright position.

Other objects and advantageous features of the invention will be fully understood from the following description and claims when the same are read in connection with the drawings, accompanying and forming part of this specification, in which:

Figure 1 is a perspective view of my novel stand or holder as the same appears when set up ready for use. Fig. 2 is a view showing the stand as folded into a bundle so as to take up but a minimum amount of space in storage or shipment. Fig. 3 is a vertical section on an enlarged scale taken through the depending arm of one of the jaws of the stand and showing the relative arrangement of the said arm and the brace bar connected therewith. Fig. 4 is a detail elevation illustrating the inner side of the said arm and the enlarged end of the brace bar disposed at said side of the arm.

Similar letters designate corresponding parts in all of the views of the drawings, referring to which:

A A are the jaws of the stand or holder constituting the best practical embodiment of my invention of which I am cognizant. There are four of the said jaws, and they are preferably made of metal and in the shape illustrated. At intermediate points of their height the jaws are provided with lateral enlargements $a$ and these are lapped and are pivotally connected together as indicated by $b$ and best shown in Fig. 1, so as to enable the upper ends of the jaws to move inward and outward and the jaws to receive and properly hold tree trunks and staffs of widely varying diameters. On their outer sides about midway between the pivot points $b$ and their upper ends the jaws are provided with apertured lugs $c$ and in these latter are journaled the T-heads $d$ at the upper ends of legs B of which there are four employed. The said legs B are preferably curved as shown in order to enable their inner portions to conform in shape to and rest snugly against the jaws when the stand is folded as shown in Fig. 2, and the outer ends of the legs are preferably enlarged and rounded as indicated by $e$ with a view of preventing the said ends from cutting or otherwise injuring a carpet or other floor covering.

By reason of the jaws A being pivotally connected together, as indicated by $b$ and before described, it will be noted that each jaw is provided with a depending arm $f$. These depending arms $f$ are preferably, though not necessarily, shaped as illustrated, and in each is formed an upright slot $g$ which communicates at its lower end with a recess or countersink $h$ formed in the inner side of the arm as best shown in Figs. 3 and 4.

C C are the brace bars which coöperate with the arms $f$ of the jaws A and the legs B to lock the said legs in their spread position and to preclude any movement whatever of the jaws when a tree trunk is disposed between the latter. The said brace bars are pivotally connected to the inner sides of the legs B or rather to lugs $i$ on the legs, and the inner portions of the bars are extended through the slots $g$ in the jaw arms $f$, and are provided with heads or enlargements $m$ and shoulders $p$ disposed below and at the outer sides of the said heads or enlargements $m$. When the stand is set up ready for use as shown in Fig. 1, the head or enlargement $m$ of each brace bar C rests in the countersink in the inner side of the jaw arm complementary to said brace bar, and the shoulder $p$ of the bar bears against the outer side of the arm all as best shown in Fig. 3. In consequence of this it will be manifest that the brace bars in combination with the depending arms of the jaws will preclude casual movement of the jaws or of the legs with the result that there is no liability of the stand casually releasing a tree trunk gripped between the jaws thereof. On the other hand it will be noted that the weight of the tree imposed on the jaws A will operate to retain the stand in its spread position and to preclude casual movement of any of the members or parts of the stand. When, however, the tree trunk is removed from the stand, the latter may be unlocked by simply raising the shoulders *p* of the brace bars out of engagement with the jaw arms *f* whereupon by moving the brace bars inwardly through the slots *g* in the jaw arms, the stand may be compactly folded as shown in Fig. 2, so as to be conveniently carried in the hand or stored in a small space.

It will be readily appreciated from the foregoing that my novel stand is adapted to receive and securely hold tree trunks of widely varying diameters; also, that a tree may be expeditiously set up in the stand with but a minimum amount of effort and that the stand is not open to any of the objections common to the ordinary expedients adopted in setting up Christmas trees. On the other hand the improved stand is neat in appearance and is susceptible of being readily draped and entirely hidden from view when the same is desirable.

Notwithstanding the practical advantages hereinbefore ascribed to my novel stand, the stand is obviously simple and inexpensive and may therefore be produced and sold with profit for a small price.

As before stated, the construction herein illustrated and described is the best practical embodiment of my invention of which I am aware, but I would have it understood that in the future practice of the invention such changes in the form, construction and relative arrangement of the parts may be made as fairly fall within the scope of my invention as defined in the claims appended.

Having described my invention, what I claim and desire to secure by Letters-Patent, is:

1. A stand for the purpose described, comprising jaws grouped about a center and pivotally connected together at intermediate points in their height, legs pivoted to and extending outward from the jaws, and brace bars connected to the legs and adjustable with respect to the lower portions of the jaws and provided with means for engaging the jaws and locking the legs when the latter are spread.

2. A stand for the purpose described, comprising jaws grouped about a center and having lateral enlargements lapped and pivotally connected together and also having depending arms in which are upright slots, legs pivoted to and extending outward from the jaws, and brace bars pivoted to the legs and extending through the slots in the jaw arms and having shoulders adjacent to their inner ends arranged to abut against the outer sides of the jaw arms.

3. A stand for the purpose described, comprising jaws grouped about a center and having lateral enlargements lapped and pivotally connected together and also having depending arms in which are upright slots and in the inner sides of which are recesses or countersinks communicating with the lower ends of the slots, legs pivoted to and extending outward from the jaws and arranged to swing vertically, and brace bars pivoted to the legs and extending through the slots in the jaw arms and having heads at their inner ends and shoulders adjacent to said ends arranged to abut against the outer sides of the jaw arms.

4. A stand for the purpose described, comprising jaws grouped about a center and pivotally connected together at intermediate points in their height and having depending arms inclined inward or toward the center to receive the weight of a tree trunk arranged between the jaws, legs adjustably connected to and extending outward from the jaws, and brace bars connected with the legs and adjustable with respect to the jaws and arranged in one position to lock the legs in their spread position, and in another position to permit of the legs being folded against the jaws.

5. A stand for the purpose described, comprising jaws grouped about a center and having their adjacent portions connected in a flexible manner at intermediate points in their height and also having depending arms, legs adjustably connected to and extending outward from the jaws, and brace bars connected with the legs and adjustable with respect to the jaws and arranged in one position to lock the legs in their spread position and in another position to permit of the legs being folded against the jaws.

In testimony whereof I have hereunto set my hand in presence of two subscribing witnesses.

PATRICK H. KELLEHER.

Witnesses:
JOHN P. SUTTON,
MAUDE M. KELLEHER.

---

Copies of this patent may be obtained for five cents each, by addressing the "Commissioner of Patents, Washington, D. C."